Jan. 17, 1967 E. SCHARF 3,298,277
GLOBULAR IMAGE PROJECTOR
Filed Nov. 7, 1963 3 Sheets-Sheet 1
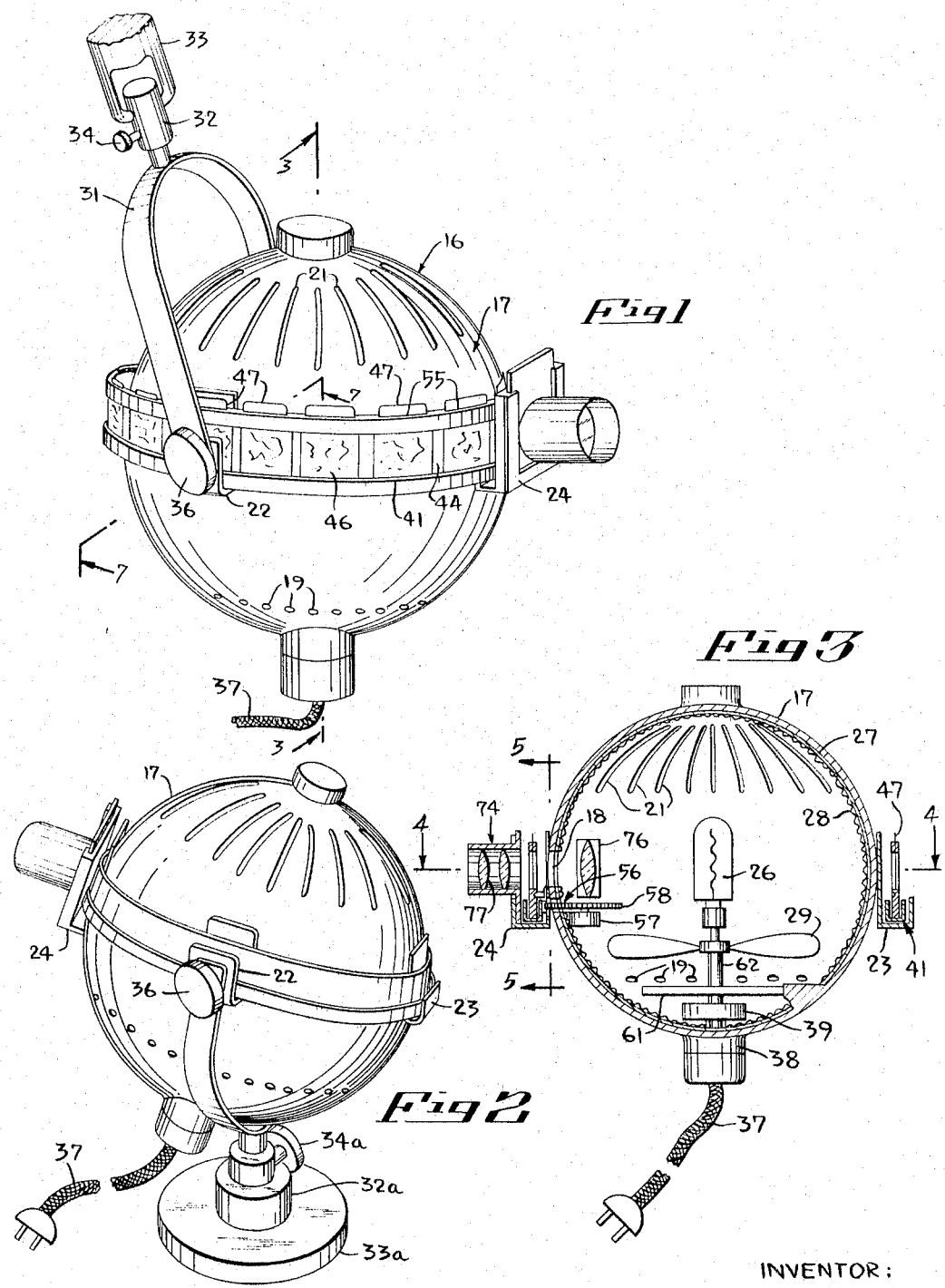
INVENTOR:
ERWIN SCHARF,
BY
HIS ATTORNEY.

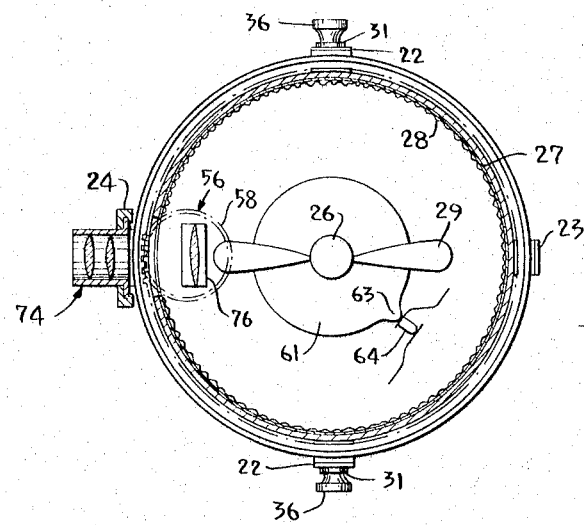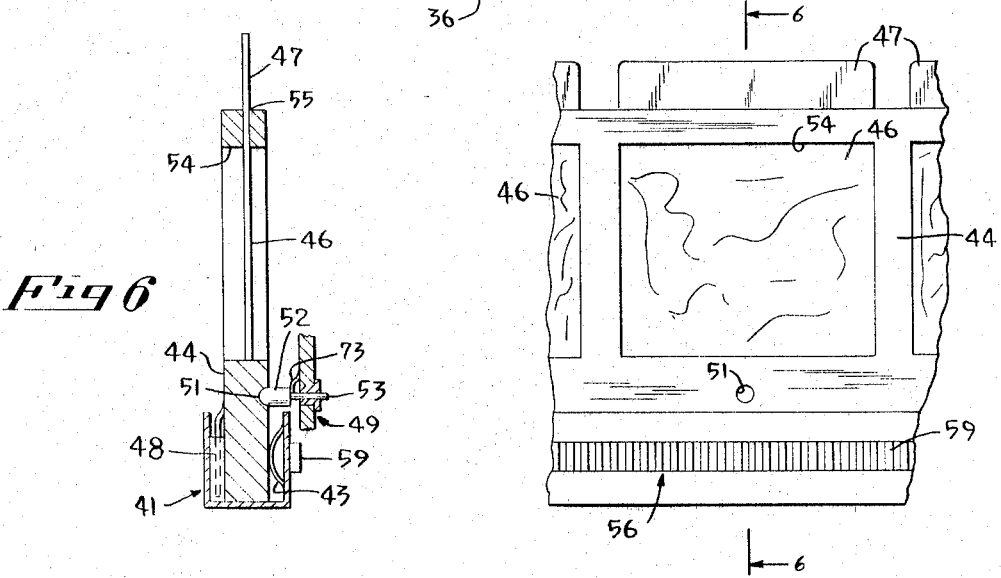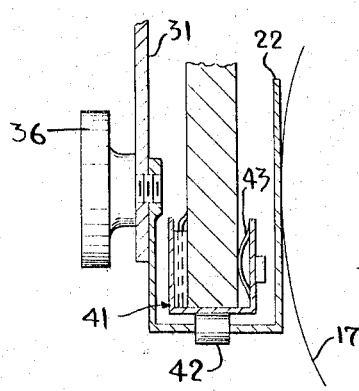

Jan. 17, 1967 E. SCHARF 3,298,277
GLOBULAR IMAGE PROJECTOR
Filed Nov. 7, 1963 3 Sheets-Sheet 3

INVENTOR:
ERWIN SCHARF,
BY
HIS ATTORNEY.

United States Patent Office 3,298,277
Patented Jan. 17, 1967

3,298,277
GLOBULAR IMAGE PROJECTOR
Erwin Scharf, 630 9th Ave., New York, N.Y. 10036
Filed Nov. 7, 1963, Ser. No. 322,574
4 Claims. (Cl. 88—27)

The invention relates to optics, and relates more particularly to projectors for projecting images onto a surface, to be viewed.

Projectors, for the projection of images, such as of slides, or other transparencies, or the like, are known and many projectors of this type now in use are satisfactory for many purposes.

They are, however, deficient therein that they do not allow enough versatility in positioning. Furthermore, they are not small enough.

It is accordingly among the principal objects of the invention to provide an image projector, which can be positioned to project substantially in any direction, and has simple and inexpensive means for the automatic feeding of successive images to be projected.

It is another object of the invention to provide a projector of this type the elements of which are, however, so arranged, and the housing of which is so shaped, and sufficiently small as to yield an overall small size.

The instant projector is not intended for large screens, but is designed to be small enough to be concealed. Preferably, the globe diameter of the instant projector, for smaller film size, could have a diameter not much larger than about five inches, or less. The instant projector is small enough to be hidden in a small space, where space is found to be valuable, such as hidden in the shelves of supermarkets, or in large display boxes.

It is another object of the invention to provide such a projector which has a globular shape and is suspended, or otherwise supported, for turning and tilting in all directions.

It is a further object of the invention to provide such a projector which will work for long periods, projecting automatically a succession of images, if need be repeatedly, without need for any supervision.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The foregoing and other objects of the invention will be best understood from the following description of exemplifications thereof, reference being had to the accompanying drawings, wherein:

FIG. 1 is a perspective view of a globular image projector in accordance with the invention;

FIG. 2 is a perspective view similar to FIG. 1, but showing a modified suspension device for the projector;

FIG. 3 is a vertical sectional view taken on the line 3—3 of FIG. 1;

FIG. 4 is a horizontal sectional view taken on the line 4—4 of FIG. 3;

FIG. 5 is a fragmentary large scale sectional view taken on the line 5—5 of FIG. 3;

FIG. 6 is a fragmentary sectional view taken on the line 6—6 of FIG. 5;

FIG. 7 is a fragmentary sectional view taken on the line 7—7 of FIG. 1;

Figure 8:
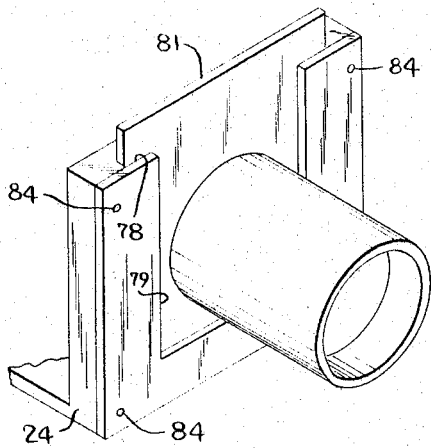
FIG. 8 is a fragmentary perspective view showing a detail of FIGS. 1 and 2.
Figure 9:
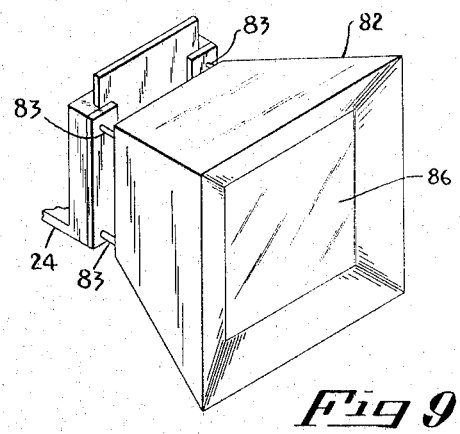
FIG. 9 is a perspective view of another detail.

In carrying the invention into effect in the embodiments which have been selected for illustration in the accompanying drawings and for description in this specification, and referring now particularly to FIG. 1, there is provided an image projector generally indicated at 16. It has a hollow spherical or globe shaped housing 17. The housing 17 may be made of metal, or of plastic, or of other material. The material need not be rigid material throughout, but may be flexible material either reinforced throughout, or reinforced at certain parts only, as will be evident to a person skilled in this art.

The housing 17 is closed, except that it has an area passing light waves, such as an opening or window 18, which is preferably located at the equatorial region of the housing 17. The housing 17 furthermore is preferably provided with lower vents such as vent holes 19, and upper vents such as vent slots 21.

For engineering convenience, the housing 17 may be made of two hemispheres, or even of a larger number of parts, assembled and held together by well-known suitable means; for the sake of clarity and simplicity, however, the housing 17 is shown in the drawing as composed of one piece.

On the exterior of the housing 17 there are mounted near the equatorial region a series of brackets, for instance two opposite side brackets 22, a rear bracket 23, and a front bracket 24. These brackets are of U-shaped cross section, as best shown in FIG. 7, and are open on top, and rigidly secured to the outer surface of the housing 17. Each bracket thus defines on the exterior of the housing 17 a channel open on top, and the channels are in circular alignment along said equatorial region.

Inside the housing 17, there is mounted an electric source of light, such as an electric lamp 26 which is effectively placed in the spherical center of the housing 17. Thus, light rays emanating from the lamp 26 will exit radially through the window 18.

A heat absorbing layer 27 may preferably line at least a portion of the internal spherical surface of the housing 17. A further layer 28, which is the innermost layer of the housing 17, provides throughout the entire inside of the housing 17 a diffusing reflecting surface.

As the lamp 26 is placed in the center of the sphere, as has previously been pointed out, the light rays which do not directly exit from the lamp 26 through the window 18, will be reflected by the surface 28 and, except for some stray rays, will also to a major extent exit through the window 18.

Below the lamp 26 there may be mounted a fan 29 that draws air through the vent holes 19 and expels it through the vent slots 21.

The housing 17 may either be suspended from above (FIG. 1), or be supported from below (FIG. 2). A fork 31 may be pivoted to the brackets 22, and the fork 31 be suspended by means of a swivel joint 32 from a chain 33 or other connection to the ceiling. The swivel joint 32 may have a set screw 34 for adjustable arresting of the movement about the vertical axis, and a set screw 36 may be mounted on each bracket 22 providing the pivot for, and the adjustable arresting of, the tilting about the horizontal axis. Thus, the housing 17 can move throughout at least a portion of a full circle about two perpendicular axes, namely the vertical axis (swivel 32) and the horizontal axis (set screws 36), and can be releasably locked in any desired position thereof by means of the respective set screws 34, 36.

The arrangement of FIG. 2 is similar to that described in connection with FIG. 1. A stand 33a is provided on which there is mounted a swivel joint 32a with set screws 34a, and a fork 31a is revolubly mounted in the swivel joint 32a. Set screws 36 are again provided for adjustment of the position of the housing 17 as it swings about the pivots, formed by the set screws 36, between the fork 31a and the brackets 22.

An electric cord 37 connects the lamp 26 to an electric source, and may enter through a center plug 38 of the housing 17. The cord 37 also leads to a timing motor 39 that drives the fan 29, as more fully explained later on.

A carrier is provided for carrying the images to and from a position of registry with the window 18. Such a carrier may, for instance, be in the form of an endless annular channel type carrier 41 that is removably positioned in the brackets 22, 23 and 24, for rotational movement therein about the vertical axis, and consequently around the equatorial region, of the housing 17. Rolls 42 (FIG. 7) may be provided in the brackets 22–24 to facilitate the rotational movement of the channel 41. The brackets 22–24 form holding means for journalling the carrier 41.

The carrier 41 preferably comprises inwardly directed resilient means such as springs 43 (FIG. 6), several of these springs being arranged along the circumference of the carrier 41. Inside the annular carrier 41 there may be removably placed a holding ring 44 which carries removable images such as slides 46 and identification tabs 47 (FIGS. 1, 6). Two slide-in holders 48 may be provided, to assure tied rotation between the carrier 41 and the ring 44.

Figure 10:
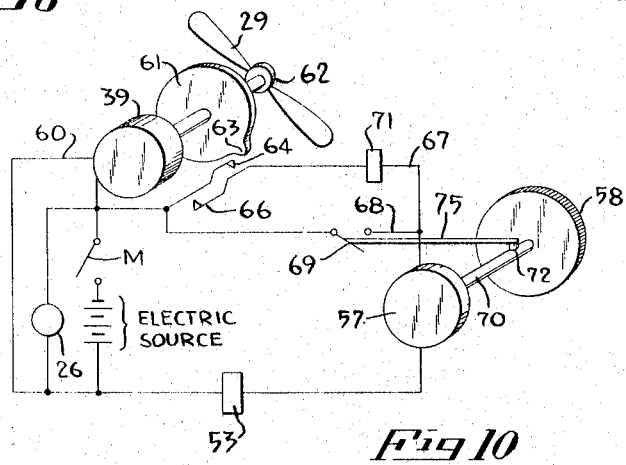
FIG. 10 is a wiring diagram.

Releasable latching means are provided that comprise a depression 51 that is formed in the holding ring 44, and a latch 52 that is rotatably positionable in the depression 51, to arrest releasably the circumferential movement of the ring 44. A relay or solenoid 53 (FIGS. 6, 10) is provided, operable when electrically energized for retracting the latch 52.

The slides 46, or similar transparencies, may merely be held by gravity and friction in their position in the individual frames 54 of the ring 44, so that they are easily insertable or removable through slots 55 that are formed in the frames 54. If desired, however, particularly when the projector is used at a steep angle of projection, well known suitable attachment means (not shown) may be provided between the frames 54 and the slides 46.

Driving means 56 (FIGS. 3, 4) are provided for rotating the carrier 41 and therewith the picture holding ring 44, to feed successive frames 54 and hence slides 46 into registry position with the window 18. These driving means comprise a drive motor 57 that may be disposed inside the housing 17. The motor 57 is in driving connection with a pinion 58; the pinion 58 also may be inside the housing and extend through an opening in the housing wall, for instance through a portion of the window 18; outside of the housing 17, the pinion 58 meshes with an annular rack 59 that is mounted on, and extends throughout, the circumference of the innermost surface of the carrier 41.

In order to advance successive slides 46 to the window 18, control means are provided for energizing the pinion 58, and for releasing the latch 52, periodically so that the carrier 41 will be driven throughout a predetermined fraction of a full circle that corresponds to the arcuate distance between two successive frames 54. This control means comprises a timing circuit 60 that includes the timing motor 39. The timing motor 39 drives not only the fan 29 but also a switch operator or cam 61 (FIGS. 3, 10) that may be mounted on the same shaft 62 as the fan 29.

The cam 61 has a nose 63 that closes once during each revolution of a switch 64; the switch 64 includes a manually operative portion 66, so that the carrier 41 may be advanced once for each revolution of the cam 61, and/or manually. When it is desired to feed the carrier 41 manually only, the cam 61 may be loosened on the shaft 62, so that the switch 64 will no longer be operated thereby cyclically.

The switch 64 forms part of an electric driving circuit 67 that includes the drive motor 57 (FIG. 3) and the solenoid 53 (FIG. 6). Thus, at each closing of the switch 64 (by the cam 61, or by hand), the drive motor 57 will be energized to drive the pinion 58, while the solenoid 53 will be energized to retract the latch 52 out of the depression 51.

The driving circuit 67 may include well known means for continuing to drive the drive motor 57 after the switch 64 has been opened, until the next frame 54 has been brought into registry with the window 18. Such means may, for instance, be a holding circuit 68 that has a switch 69 that is controlled by a relay 71 and by a protuberance 72 on the shaft 70. The holding circuit 68 will be opened by the protuberance 72 acting on a switch opener 75 to open the switch 69 at the time when the next depression 51 passes the latch 52. The latch 52, owing to the force of its spring 73, will then move into the depression 51 having been released from the force of the relay 53 when the switch 69 was opened.

The optical system 74 may include a condenser lens or lens means 76 and an objective lens or lens means 77. Each of these lenses or lens means may comprise an entire lens assembly, as is well known to those skilled in optics. The condenser lens 76 may be fixed in the housing 17, while the objective lens 77 may be removably placed in front of the housing 17.

In accordance with a preferred embodiment, the front bracket 24 has a slot 78, and a frontal recess 79. The objective lens 77 is carried on a slide 81 that slidingly fits into the slot 78, so that when emplaced, the objective lens 77 will project through the recess 79, radially outwardly relative to the housing 17.

Thus, any image 46 when it is in registry with the window 18 will be in registry with the optical axis of the system 74, for image projection by means of the lamp 26 and the lenses 76 and 77.

In accordance with a modification, there is provided a tapered screen holding frame 82 that may be mounted on the bracket 24, by means of mounting screws which engage threaded holes 84 in the bracket 24. The frame 82 carries in front a screen 86 for image projection.

Figure 11:
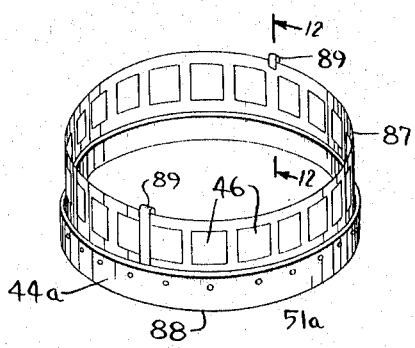
FIG. 11 is a perspective view showing a modified detail.
Figure 12:
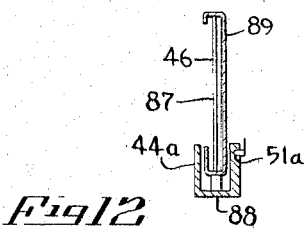
FIG. 12 is a vertical sectional view taken on the line 12—12 of FIG. 11.

As best shown in FIGS. 11 and 12, the individual slides may be replaced by an annular film strip 87 that carries the individual images 46. A holding ring 44a is provided, which is similar to the previously described holding ring 44. The holding ring 44a has an annular base 88 with which it rests in the carrier 41, and may be provided with depressions 51a similar in outline and purpose to the previously described depressions 51.

The operation of the above described embodiments is as follows:

A holding ring 44 (or 44a) is inserted from above into the carrier 41, where the ring will be engaged by the springs 43. Thereafter, the electric circuits may be energized, by connecting the cord 37 to the electric network, which corresponds in the wiring diagram of FIG. 10 to the closing of the main switch M. Thereupon, the lamp 26 will be lit, and will commence the sending of light rays through the window 18 and the optical system 74. The timing motor 39 will turn the fan and also turn the cam 61. Periodically, thereupon, the cam 61 will close the switch 64, resulting in operation of the relay 53, the relay 71, and of the motor 57. The relay 71 will close the switch 69 of the holding circuit 68, to keep the motor 57 and relay 53 energized, until the switch 69 is opened again. When the motor 57 is energized, it will drive the pinion 58 which, in turn, will rotate the carrier 41.

When the relay 53 is energized, it will cause retraction of the latch 52, enabling the aforesaid drive of the carrier 41. The carrier 41 will be driven until the protuberance 72 opens the switch 69, at the moment when the next depression 51 is put in registry with the latch 52. This indicates that the next frame 54 has been registered with the optical system 74, and the spring 73 will press the latch 52 into that next depression 51.

If desired, the switch 64 may instead be operated by hand at 66.

As previously pointed out, the switch 64 needs to be closed but momentarily, the holding circuit 68 assuring that the drive motor 57 will not be de-energized at the opening of the switch 64. It will be understood by those skilled in this and related arts, however, that other means may instead be provided for keeping the motor energized until the next frame 54 is in place; such a means may include a widening of the nose 63, to keep the switch 64 closed for the necessary period of time.

As long as the main switch M remains closed, the ring 44 will carry the images 46 in succession in front of the window 18 to be projected. Thus, one after the other picture will be projected, and thereafter the same series of pictures will be projected again, until the switch M is opened.

Exchange to another picture series is simple. A new series of pictures may have been placed in another holding ring 44, and the previously used holding ring 44 may be lifted out upwardly of the carrier 41, and then the new ring 44 be snapped into the carrier 41.

A different holding ring 44 may be provided for different size transparencies; for instance, one type holding ring 44 for 35 mm. double frame images, a different one for 35 mm. single frames, and different rings 44 again for 16 mm., or for 8 mm. images. The different size holding ring 44 will have the same diameter, and the holes 51 will always be in the same position, so that upon each shifting a new frame will be put in register with the window 18, irrespective of which size transparency is being used. The ring 44 with the transparencies is interchangeable; and, as explained, for each size image there is a different ring, though all the rings 44 fit into the carrier 41.

To each type of size image there is furthermore assigned a respective objective lens 77. As the objective lens 77 is removable, it is correspondingly interchanged along with the interchange of rings 44 of different image size.

The window 18 is large enough for the largest size image; and shielding means, such as covers (not shown), may be arranged to prevent the entry of light from above into the front bracket 24 particularly when the smaller size transparencies are used.

In the embodiment of FIG. 1, before the ring 44 can be interchanged, the fork 31 will need to be bent downwardly to clear the lifting path for the holding ring 44.

Alternatively, an operator may prefer to lift out individual slides 46 through the slots 55 of the holding ring 44, and replace them with new slides.

To exchange the film strip 87 of FIGS. 11 and 12, on the other hand, the entire film strip may be removed either out of the ring 44a, or together with the ring 44a, and exchanged.

It will be observed that the wiring may be such that the direction of feed may be reversed, so that the succession of frames is reversible. This may be made by making the drive motor 57 reversible, or by any other suitable well-known device.

Certain of the advantages of the invention have already been herein referred to. It may be useful, however, to allude particularly at this point to the advatage of utilizing the spherical inner surface of the housing 17 as a diffusing reflecting surface throughout the entire globe interior; as well as to the simplicity of the device and its easy adaptation for mass production at low cost.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a projector, for use in projecting images, in combination, a hollow housing, adjustable external support means suspending said housing pivotably for movement of the housing throughout at least a portion of a full circle about two perpendicular pivot axes, a light source supported inside said housing, said housing having an opening passing light rays from said source along an optical axis, an annular carrier surrounding said housing and being rotatable substantially along the periphery of a circle about an axis of rotation and disposed adjacent said opening and adapted to hold images and to register in succession each image with said opening for image projection, holding means operable for journalling said carrier rotatably, and driving means operable for rotatably moving said carrier about said axis of rotation, said support means including two aligned pivots oppositely secured with relation to said housing and disposed outside said annular carrier, the axis of said two aligned pivots substantially coinciding with a diameter of the circle of said carrier disposed at an angle to said optical axis.

2. In a projector, as claimed in claim 1, and adjusting means releasably retaining said housing in any position about said axes moved to.

3. In a projector, as claimed in claim 1, a fan disposed inside said housing for cooling said light source, and vents defined in the wall of said housing above said light source.

4. In a projector, as claimed in claim 1, said holding means comprising two brackets oppositely mounted on said housing aligned on said axis of said two aligned pivots, each bracket supporting said carrier near the exterior of said housing and mounting spaced therefrom towards the outside one of said two pivots.

References Cited by the Examiner

UNITED STATES PATENTS

| | | | |
|---|---|---|---|
| 250,759 | 12/1881 | Scott | 88—27 |
| 2,319,284 | 5/1943 | Zwirn | 88—27 |
| 2,483,216 | 9/1949 | Marshall | 88—24 |
| 2,625,074 | 1/1953 | Nistri | 88—24 |
| 2,783,679 | 3/1957 | Goldberg. | |
| 3,094,037 | 6/1963 | Kapilow | 352—129 |
| 3,130,637 | 4/1964 | Golden | 88—28 |

JULIA E. COINER, *Primary Examiner.*

NORTON ANSHER, *Examiner.*

H. H. FLANDERS, *Assistant Examiner.*